(12) United States Patent
Rubenstein

(10) Patent No.: US 8,768,532 B2
(45) Date of Patent: Jul. 1, 2014

(54) INDIRECT THERMAL FAN CONTROL

(75) Inventor: Brandon A. Rubenstein, Lynnwood, WA (US)

(73) Assignee: Microsoft Corporation, Redmond, WA (US)

( * ) Notice: Subject to any disclaimer, the term of this patent is extended or adjusted under 35 U.S.C. 154(b) by 281 days.

(21) Appl. No.: 13/184,233

(22) Filed: Jul. 15, 2011

(65) Prior Publication Data

US 2013/0018523 A1 Jan. 17, 2013

(51) Int. Cl.
*G05D 23/00* (2006.01)

(52) U.S. Cl.
USPC .............................. 700/300; 714/14; 429/99

(58) Field of Classification Search
USPC .............................. 714/14; 429/99; 700/300
See application file for complete search history.

(56) References Cited

U.S. PATENT DOCUMENTS

| | | | | |
|---|---|---|---|---|
| 6,421,754 | B1 * | 7/2002 | Kau et al. .................. | 710/261 |
| 6,935,130 | B2 * | 8/2005 | Cheng et al. ................ | 62/259.2 |
| 6,996,441 | B1 * | 2/2006 | Tobias ........................ | 700/44 |
| 7,502,952 | B2 * | 3/2009 | Chotoku et al. ............ | 713/340 |
| 2004/0027799 | A1 | 2/2004 | King et al. | |
| 2004/0158771 | A1 * | 8/2004 | Garnett et al. .............. | 714/14 |
| 2011/0064981 | A1 * | 3/2011 | Scheucher .................. | 429/99 |

OTHER PUBLICATIONS

"Fan Speed Control is Cool", *Maxim Integrated Products*, Available at <http://pdfserv.maxim-ic.com/en/an/AN1784.pdf>, pp. 1-13.
"Power System Thermal Design", *Artesyn*, Available at >http://www.coolpowersolutions.fi/Library/PSTD.pdf>, pp. 1-27.
Economou, Dimitris et al., "Full-System Power Analysis and Modeling for Server Environments", *In Proceedings of MoBS 2006*, Available at <http://www-mount.ece.umn.edu/~jjyi/MoBs/2006/program/3A-Economou.pdf>, (Jun. 2006), 8 pages.
Felter, Wes et al., "Power Measurement on the Apple Power Mac G5", *IBM Research Report RC23276* (W0407-046), Available at <http://domino.watson.ibm.com/library/cyberdig.nsf/papers/e6ebd3c859fb49f785256ed8006a3f4a/$file/rc23276.pdf>, (Jul. 20, 2004), 15 pages.
Tolia, Niraj et al., "Delivering Energy Proportionality with Non Energy-Proportional System—Optimizing the Ensemble", *In Proceedings of HotPower 2008*, Retrieved from: <http://www.usenix.org/event/hotpower08/tech/full_papers/tolia/tolia_html/>, on Apr. 29, 2011),(Dec. 7, 2008), 8 pages.

* cited by examiner

*Primary Examiner* — Mohammad Ali
*Assistant Examiner* — Anthony Whittington
(74) *Attorney, Agent, or Firm* — Jeremy Snodgrass; Glen Johnson; Micky Minhas

(57) ABSTRACT

Indirect thermal fan control is described. In one or more implementations, a speed of a fan may be adjusted based on indirect measurements of temperature. For example, a temperature of air entering an enclosure and a current draw of an electrical component within the enclosure may be determined. A speed of a fan may then be adjusted based on the temperature of the air and the current draw of the component to change a flow of the air over the electrical component.

20 Claims, 6 Drawing Sheets

INDIRECT THERMAL FAN CONTROL

BACKGROUND

Fans are often used to remove excess heat generated by electrical components of devices such as laptops, servers, displays, gaming consoles, and so on. While a fan may effectively cool components of the electronic device, the fan may also generate excessive noise at elevated speeds. This excessive noise can be mitigated by reducing a speed of the fan to the lowest speed at which sufficient cooling is still provided to the components of the electronic device.

To ensure that a speed of the fan is sufficient to cool a component, the speed of the fan is typically based on a directly measured temperature of the component. The sensors used to directly measure the component's temperature, however, are often expensive, hard to place in componentry-dense locations, or limited in number per device making direct sensing of some components difficult or impractical. Without direct temperature measurements, fan speeds are set conservatively high to ensure un-monitored components remain cooled. These higher-than-necessary fan speeds can result in wasted energy and increased noise levels that disrupt or interfere with a user's experience.

SUMMARY

Indirect thermal fan control is described. In one or more implementations, a speed of a fan may be adjusted based on indirect measurements of temperature. For example, a temperature of air entering an enclosure and a current draw of an electrical component within the enclosure may be determined. A speed of a fan may then be adjusted based on the temperature of the air and the current draw of the component to change a flow of the air over the electrical component. Alternately or additionally, a power consumption of the electrical component may be calculated or a temperature of the electrical component may be estimated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Conventional techniques for fan speed control adjusted a speed of a fan based on component temperature measurements. The sensors that measure component temperatures are expensive and not easily implemented in componentry-dense locations. As such, temperatures of some components of an electronic device may not be monitored which results in conservative fan speed control to ensure component cooling. This could lead to wasted energy and excessive fan noise as the fan operates at higher-than-necessary speeds.

Techniques of indirect thermal fan control described herein. A speed of a fan is adjusted based on a temperature of air entering an enclosure and a current draw of a component within the enclosure. Thus, the speed of the fan may be adjusted based on indirect measurements that are useful to estimate a temperature of the component affected by air flow of the fan. These indirect measurements can be leveraged to improve efficiency of the fan and/or reduce excessive noise while providing sufficient air flow to cool the component. In one or more implementations, a thermal controller determines a temperature of air entering an enclosure, determines a current draw of a component within the enclosure, and adjusts a speed of a fan based on the determined temperature and the determined current draw. Additionally, a power consumption of a component can be calculated and/or a temperature of the component can be estimated which may be useful in adjusting a speed of a fan. Further discussion of these and other techniques may be found in relation to the following figures.

In the following discussion, an example environment is first described in which the techniques described herein may be implemented. Example procedures are then described which may be performed in the example environment as well as other environments. Consequently, performance of the example procedures is not limited to the example environment and the example environment is not limited to performance of the example procedures.

Example Environment

Figure 1:
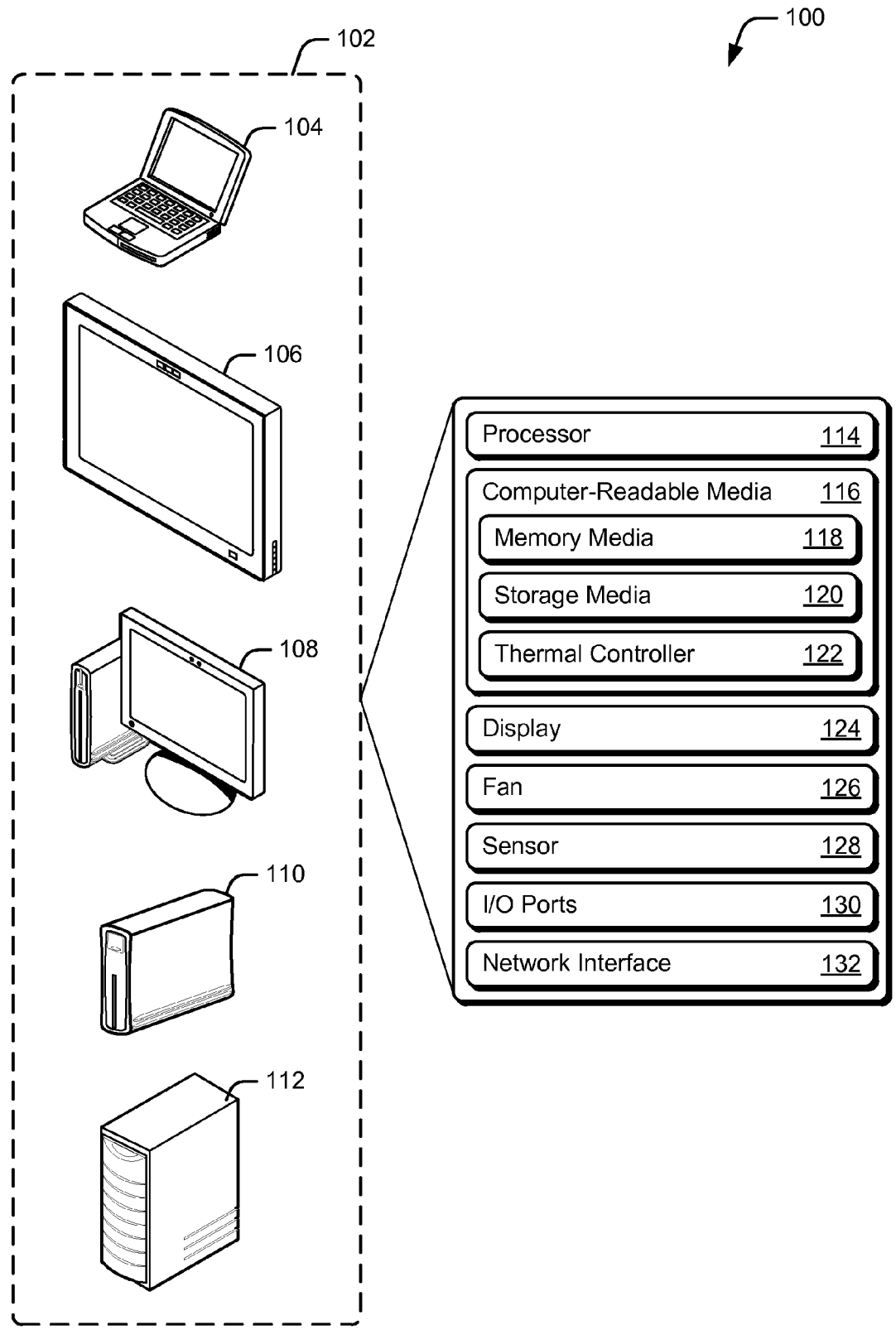
FIG. 1 is an illustration of an example environment in which techniques of indirect thermal fan control may be implemented.

FIG. 1 is an illustration of an example environment 100 in which techniques of indirect thermal fan control can be implemented. Environment 100 includes computing device 102 which is illustrated, by way of example and not limitation, as one of a laptop computer 104, television device 106, desktop computer 108, gaming device 112, or server 112. Thus, the computing device 102 may range from full resource devices with substantial memory and processor resources (e.g., personal computers, game consoles) to a low-resource device with limited memory and/or processing resources (e.g., traditional set-top boxes, hand-held game consoles).

Generally, computing device 102 consumes energy to perform operations or implement functions for an end user, client, peer, viewer and the like. Energy not entirely consumed or otherwise emitted (e.g., as light emissions or communicative radio frequency transmissions) by the various components of computing device 102 is often released as excess heat. This heat, if not removed from computing device 102 or components thereof, can cause an increase in temperatures of the components individually and computing device 102 in aggregate.

Computing device 102 includes processor 114 and computer-readable media 116, which includes memory media 118 and storage media 120. Applications and/or an operating system (not shown) embodied as computer-readable instructions on computer-readable memory 116 can be executed by processor 114 to provide some or all of the functionalities described herein. Computer-readable media also includes thermal controller 122. In some cases, thermal controller 122 may be implemented by or integrated with an embedded controller (not shown) of computing device 102. How thermal controller 122 is implemented and functions varies, and is described as part of the procedures discussed below.

Generally, any of the features of indirect thermal fan control described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor. The program code can be stored in one or more computer readable memory devices (e.g. firmware of an embedded controller). The features of indirect thermal fan control described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, computer-readable medium 116 may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium (e.g., storage media 120) and thus is not a signal bearing medium.

When configured as a display device, computing device 102 may also include display 124. Display 124 is capable of displaying content from a local source (e.g., memory media 118 or storage media 120) or from an external source such as a network or other content distribution system. Display 124 may be separate or integral with components of computing device 102; integral examples laptop computer 104, and television device 106; a separate example includes desktop computer 108 (e.g., when embodied as a separate tower and monitor (shown))

Computing device 102 also includes fan 126 and sensor 128. One or more fans 126 are capable of generating and/or manipulating air flow within or proximate of computing device 102. In at least some implementations, fan 126 is variable speed and/or includes a tachometer sensor to provide feedback to thermal controller 122 or an embedded controller. Generally, fan 126 is useful to expel or mitigate the above-mentioned excess heat from computing device 102 or components thereof.

Sensor 128 can be any suitable type sensor that is capable of monitoring various aspects of operational characteristics of computing device 102. Sensor 128 may transmit data or information in a variety of ways including analog signals, digital signals, or various communication protocols, such as System Management Bus (SMBus), 1-wire, Inter-Integrated Circuit ($I^2C$), and the like. Sensor 128 may include a thermal sensor configured to monitor temperatures within or proximate of computing device 102. This thermal sensor may include any suitable type of sensor, such as by way of example and not limitation, a thermistor, a temperature sensing integrated circuits (ICs), a resistance temperature detector (RTDs), a thermocouple, and the like.

Sensor 128 may also include a current sensor configured to measure current draw on a power rail supplying current to components or an amount of current consumed by a component of computing device 102. This current sensor may include any suitable type of sensor, such as a sense resistor, electronic-fuse, or integrated sensor of a power supply IC.

Computing device 102 may also include input/output (I/O) ports 130 and network interface 132. I/O ports 130 of computing device 102 enable interaction with other devices, media, or users. I/O ports 130 can include a variety of ports, such as by way of example and not limitation, high-definition multimedia (HDMI), digital video interface (DVI), display port, fiber-optic or light-based, audio ports (e.g., analog, optical, or digital), USB ports, serial advanced technology attachment (SATA) ports, peripheral component interconnect (PCI) express based ports or card slots, serial ports, parallel ports, or other legacy ports. In at least some instances, content or data is received by computing device 102 via one or more I/O ports 130 from another device or source (e.g., a set-top box, external storage media, or content receiving device).

Computing device 102 may also include network interface 132 for communicating data over wired, wireless, or optical networks. By way of example and not limitation, network interface 132 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like.

Figure 2:
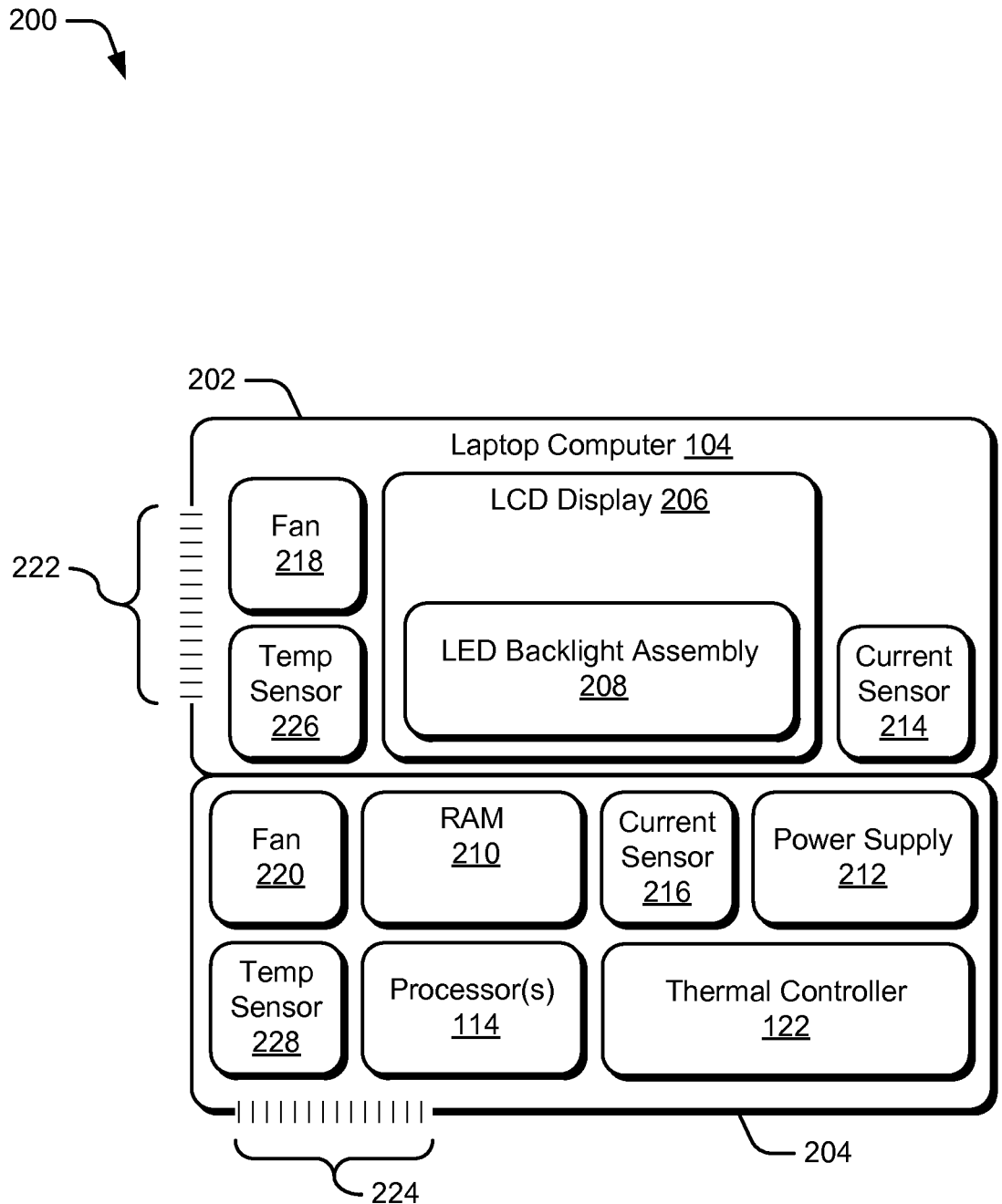
FIG. 2 is an illustration of an example computing device of FIG. 1 in greater detail.

FIG. 2 is an illustration of a detailed example of a computing device of FIG. 1 capable of implementing techniques described herein. In this particular example, laptop computer 104 is shown in detail including display enclosure 202 and base enclosure 204 which are operably coupled. Display enclosure 202 houses display components, such as liquid crystal display cell 206 and light emitting diode (LED) backlight assembly 208. LED backlight assembly 208 may include LEDs, a lens assembly, current/charge pumps, power transistors, linear power supplies and so on. In some case, display enclosure 202 may include a touchscreen assembly or antennas for wireless communication via network interface 132. Although illustrated as an LED backlit display, other types of backlighting technology are contemplated such as cold cathode fluorescent lamps (CCFLs) and the like.

Base enclosure 204 houses components of a main-board (not shown) such as processor 114, random-access memory (RAM) 210 (an implementation of memory media 118), and power supply 212. Although not shown in this example, base enclosure may also include batteries, user-input devices (e.g., keyboards and track-pads), disk drives, optical drives, and the like. Processor 114 may be configured in any suitable fashion, such as a single-core processor, a multi-core processor, or multiple multi-core processors and so on. Additionally, processor(s) 114 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

Alternatively, the mechanisms of or for processors, and thus of or for an electronic system or computing device, may include, but are not limited to, quantum computing, graphene-based computing, optical computing, mechanical computing (e.g., using nanotechnology), and so forth. Additionally, although shown as a single memory, RAM 210 is representative of a wide variety of types and combinations of memory may be employed, such as non-volatile RAM (NVRAM), flash memory modules or devices, read-only memory (ROM), hard disk memory, removable medium memory, and other types of computer-readable media.

Power supply 212 provides power for components of laptop computer 104 and may comprise any suitable type of power supply such as, by way of example and not limitation, a switch-mode, push-pull, linear, fly-back, and the like. Various components of laptop computer 104 are operably coupled with power supply 212 through one or more power rails (not shown) capable of distributing power through a computing device. Additionally or alternately, power supply 212 may provide one or more power rails each having a different respective voltage, such as 1.2V, 3.3V, 5V, or 12V just to name a few.

In some cases, power supply 212 or other power supplies of laptop computer 104 may monitor and report a voltage level and/or current draw of a power rail to an embedded controller or thermal controller 122. The power rails may also have a hierarchical structure consisting of main power rails from which other power rails may connect to distribute power to sub-systems. In some cases, the hierarchical structure is based on power states of a computing device or criticality of the components associated with said power rail. For instance, processor 114 may have a dedicated power rail or may share a power rail with RAM 210.

Current provided by power rails within a computing device can be measured with current sensors, such as current sensors 214 and 216, located throughout the computing device. In some cases, the current sensors are located near a distribution node of a current rail to measure an amount of current provided to components downstream of the distribution node. In other cases, the current sensors are located near components to measure an amount of current consumed by the components or a few components which consume an inordinate amount current from the power rail.

Display enclosure 202 and base enclosure 204 also include fans 218 and 220 respectively. Fans 218 and 220 are capable of generating and/or manipulating air flow within or proximate of computing device 102. Generally, fans 218 and 220 provide cooling for components of laptop computer 104 by creating or changing a flow of air over or around the components, or heat sinks associated therewith. For instance, when processor 114 or RAM 210 are operably coupled with a heat sink device (e.g., a finned copper or aluminum sink) fan 220 cools these components by moving air over the heat sink or through a radiating element associated therewith.

Air for cooling laptop computer 104 enters display enclosure 202 and base enclosure 204 through air inlets 222 and 224 respectively. Although illustrated as two inlets, a computing device may include any suitable number of air inlets and or air outlets (not shown). In this particular, as ambient air enters the respective enclosures, temperature (temp) sensors 226 and 228 can measure a temperature of the air entering the enclosures via air inlets 222 and 224 respectively. As described with reference to procedures discussed below, a temperature of air entering a computing device can be leveraged by indirect thermal fan control techniques to improve cooling efficiency and reduce excess fan noise.

Example Procedures

The following discussion describes indirect thermal fan control techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the computing device of FIG. 2.

Figure 3:
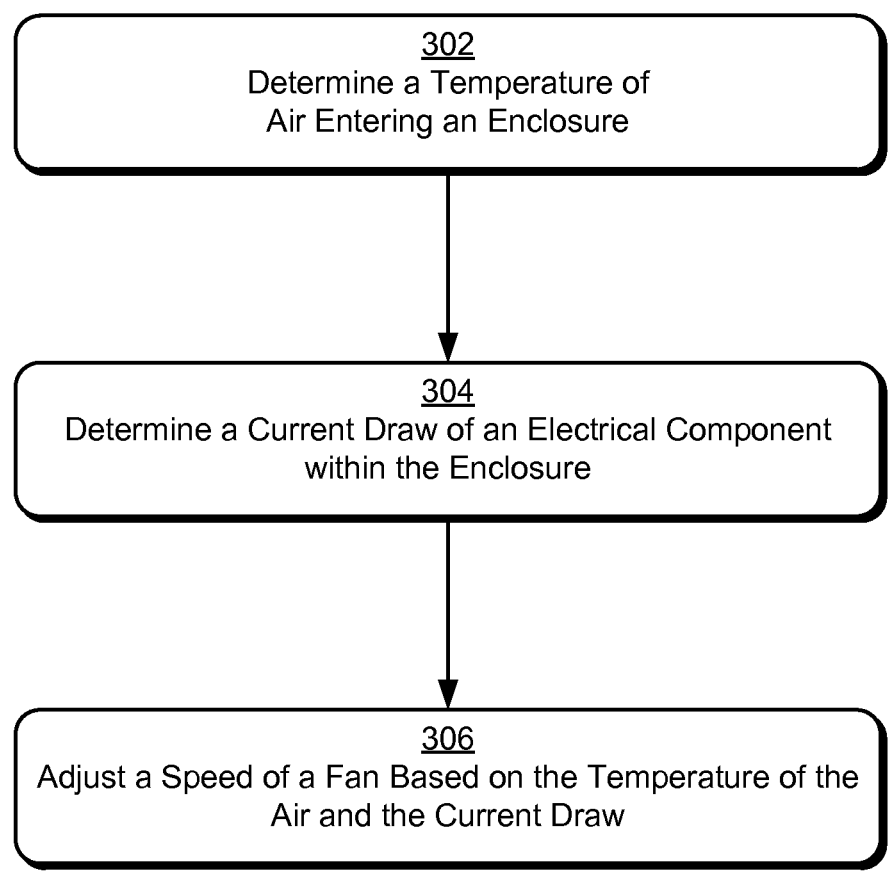
FIG. 3 is a flow diagram depicting a procedure in an example implementation in which a speed of a fan is adjusted to change a flow of air over an electrical component.

FIG. 3 depicts a procedure 300 in an example implementation in which a speed of a fan is adjusted to change a flow of air over an electrical component. A temperature of air entering an enclosure is determined (block 302). The temperature of the air may be received from a sensor proximate an air inlet through which the air enters the enclosure. Consider procedure 300 in the context of FIG. 2, in which thermal controller 122 receives a temperature of air entering base enclosure 204 from temp sensor 228. Here, assume that the air entering base enclosure 204 will flow across component RAM 210.

A current draw is determined for an electrical component within the enclosure (block 304). This may be performed in a variety of ways. For example, an indication of current draw may be received from a current sensor on a power rail with which the electrical component is connected. Data associated with current draw may also be received from power supply providing power to the component. In some cases, a power consumption of the electrical component is calculated based on the current draw and a voltage level of a power rail to which the electrical component is connected.

Further, in these cases, a temperature of the electrical component can be estimated based on the calculated power consumption and the temperature of the air. For instance, a temperature of an electrical component may be proportional to an amount of power consumed and a temperature of air entering an enclosure. Continuing the present example, thermal controller 122 receives current draw data from current sensor 216 for RAM 210.

A speed of a fan within the enclosure is adjusted based on the determined temperature and the determined current draw (block 306). This is effective to change a flow of air over the electrical component within the enclosure. In some cases, the speed of the fan is adjusted based on a calculated power consumption and/or an estimated temperature of the electrical component. By adjusting the air flow of the electrical component, a temperature of the electrical component can be effectively managed, such as maintaining a component's temperature within design or manufacturer specifications.

In some cases, an information table can be constructed to correlate a temperature of the component with a current consumption and a temperature of air entering an enclosure. Once constructed, a speed of a fan can be controlled directly using the information contained within the table to efficiently cool one or more electrical components based on a current draw and air temperature. Concluding the present example, thermal controller 122 decreases a speed of fan 220 based on a decreased current draw of RAM 210. Decreasing a fan speed lowers a noise level associated with the fan and can reduce excessive noise that may interfere with an end user's experience.

Figure 4:
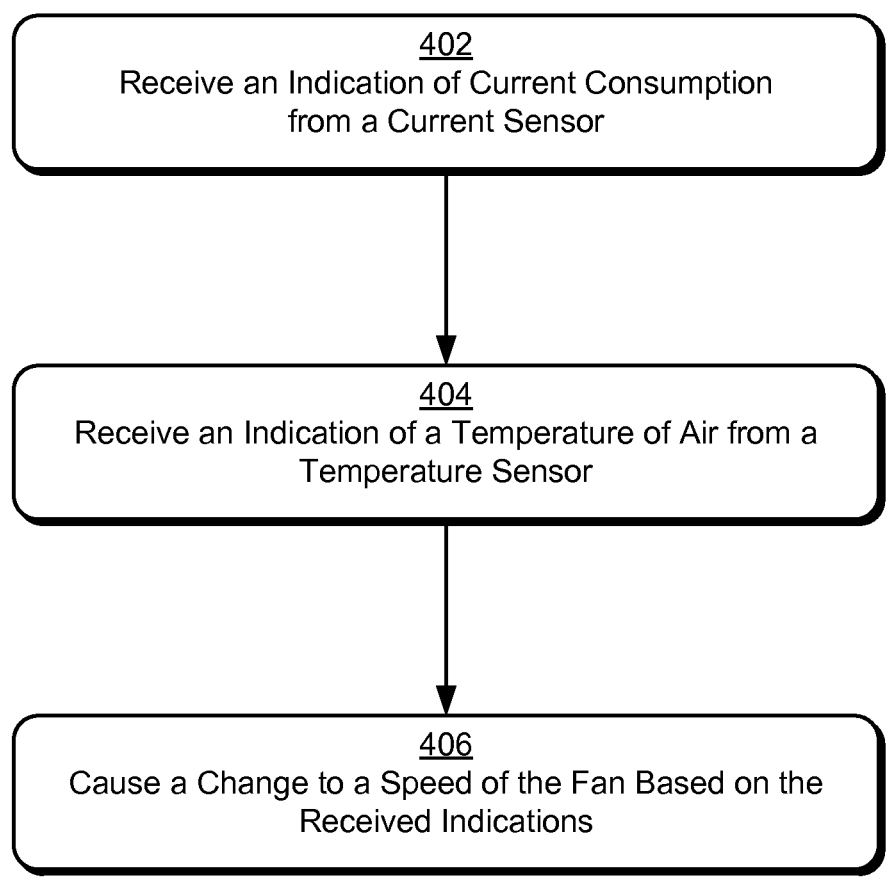
FIG. 4 is a flow diagram depicting a procedure in an example implementation in which a speed of a fan is caused to change to manage a temperature of an electrical component.

FIG. 4 depicts a procedure 400 in an example implementation in which a speed of a fan is caused to change to manage a temperature of an electrical component. An indication of a current consumption for an electrical component is received from a current sensor (block 402). The electrical component is housed within an enclosure having one or more air inlets. The current sensor may be any suitable sensor such as those mentioned above or integrated with a power supply providing current to the electrical component. The indication may be an analog signal, digital signal, or data received via a communication protocol such as SMBus, 1-wire, or I$^2$C and the like. In some cases, a power consumption of the electrical component is calculated based on the current draw and a voltage level of a power rail to which the electrical component is connected. Further, in these cases, a temperature of the electrical component can be estimated based on the calculated power consumption and the temperature of the air.

An indication of a temperature associated with air entering the enclosure is received from a temperature sensor (block 404). The temperature sensor may be located at any suitable location, such as an edge of a printed-circuit board (PCB), proximate one of the air inlets of the enclosure, and so on. Alternately or additionally, an indication of a temperature of air exiting the enclosure may be received.

A speed of a fan is caused to change based on the indications of the current consumption and the temperature of the air. (block 406). This can be effective to manage a temperature of the electrical component. In some cases, the speed of the fan is adjusted based on a calculated power consumption and/or an estimated temperature of the electrical component. A fan speed may be decreased, as permitted based on the indications of current consumption and temperature, to lower a noise level associated with the fan reducing excessive noise the fan may be generating.

Figure 5:
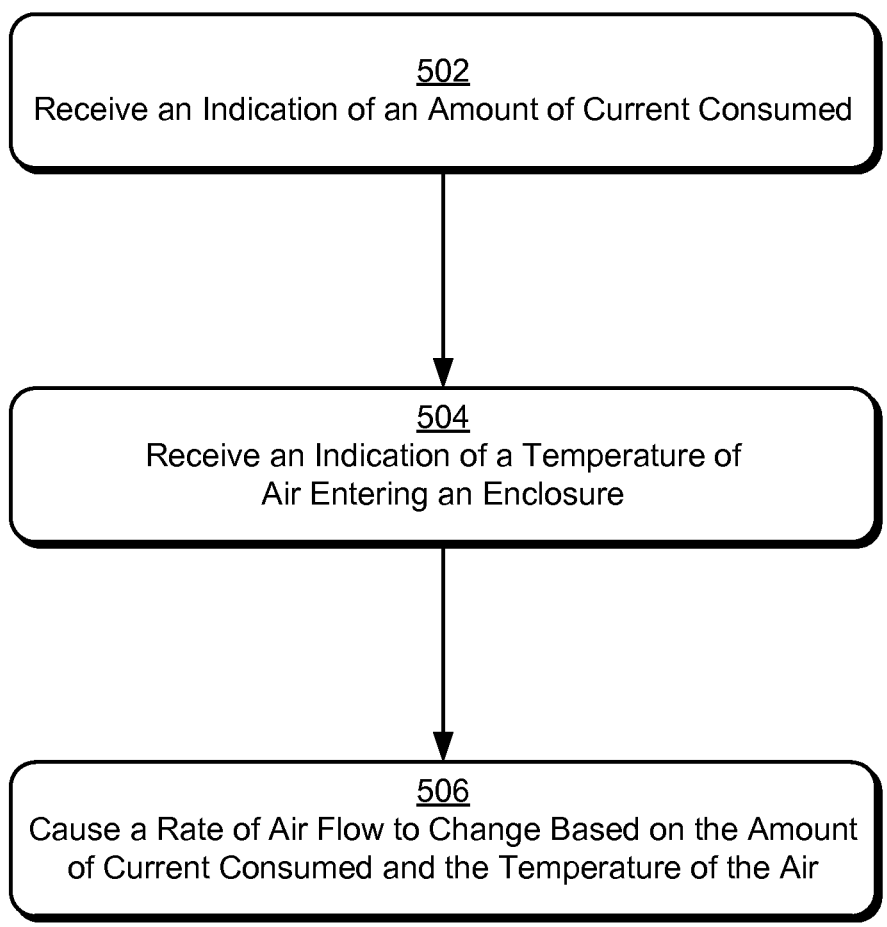
FIG. 5 is a flow diagram depicting a procedure in an example implementation in which a rate at which air flows over one or more components is caused to change.

FIG. 5 depicts a procedure 500 in an example implementation in which a rate at which air flows over one or more components is caused to change. An indication of an amount of current consumed by an electrical component within an enclosure is received (block 502). The indication may be received from any suitable source such as a current sensor and/or a power supply with current monitoring capabilities. The indication may be an analog signal, a digital signal, or a communication received over a protocol, such as SMBus, 1-wire, I$^2$C, and the like.

In some cases, a power consumption of the electrical component is calculated based on the amount of current and a voltage level of a power rail to which the electrical component is connected. Further, in these cases, a temperature of the electrical component can be estimated based on the calculated power consumption and the temperature of the air. Consider procedure 500 in the context of FIG. 2, in which thermal controller 122 receives, from current sensor 214, an indication of an amount of current consumed by LED backlight assembly 208.

An indication of a temperature of air entering the enclosure is received (block 504). The indication of the temperature of the air can be received from any suitable source such as a thermal sensor or a thermal-couple. In some cases the thermal sensor or thermocouple is located proximate an air inlet of the enclosure. Alternately or additionally, an indication of a temperature of air exiting the enclosure may be received. Here, assume that fan 218 pulls air into display enclosure 202 through air inlet 222. As the air flows into display enclosure 202 towards LED backlight assembly 208, temp sensor 226 detects a temperature of the air and transmits an indication of the temperature of the air to thermal controller 122.

A rate at which air flows over the electrical component is caused to change by adjusting a speed of a fan (506). Causing the change of the rate of airflow is based on the indications of the amount of current consumed and the temperature of the air. Adjusting the speed of the fan based on indications can be effective to manage a temperature of the electrical component without directly measuring a temperature of the component. By so doing, a speed of a fan can be reduced to mitigate fan noise while providing sufficient cooling to an un-monitored component.

Concluding the present example, thermal controller 122 changes a speed of fan 218 to change a rate at which air flows over LED backlight assembly 208 (or a heat sink associated therewith). Here assume that thermal controller 122 determines, based on the indications of the current draw and the temperature of the air, that the rate at which air is flowing over LED backlight assembly 208 is excessive and can be reduces while still providing sufficient cooling. Thermal controller 122 reduces the speed of fan 218 which changes the rate at which air flows over LED backlight assembly 208 and lowers a noise level associated with fan 218.

Operations of procedure 500 (as well as any of those of procedure 300 and/or 400) may be performed iteratively in order to determine a speed of a fan which efficiently cools components of a computing device while producing a minimal amount of noise. Data collected from these iterations can be used to build an information table or data base useful to implement techniques of indirect thermal fan control.

Example Device

Figure 6:
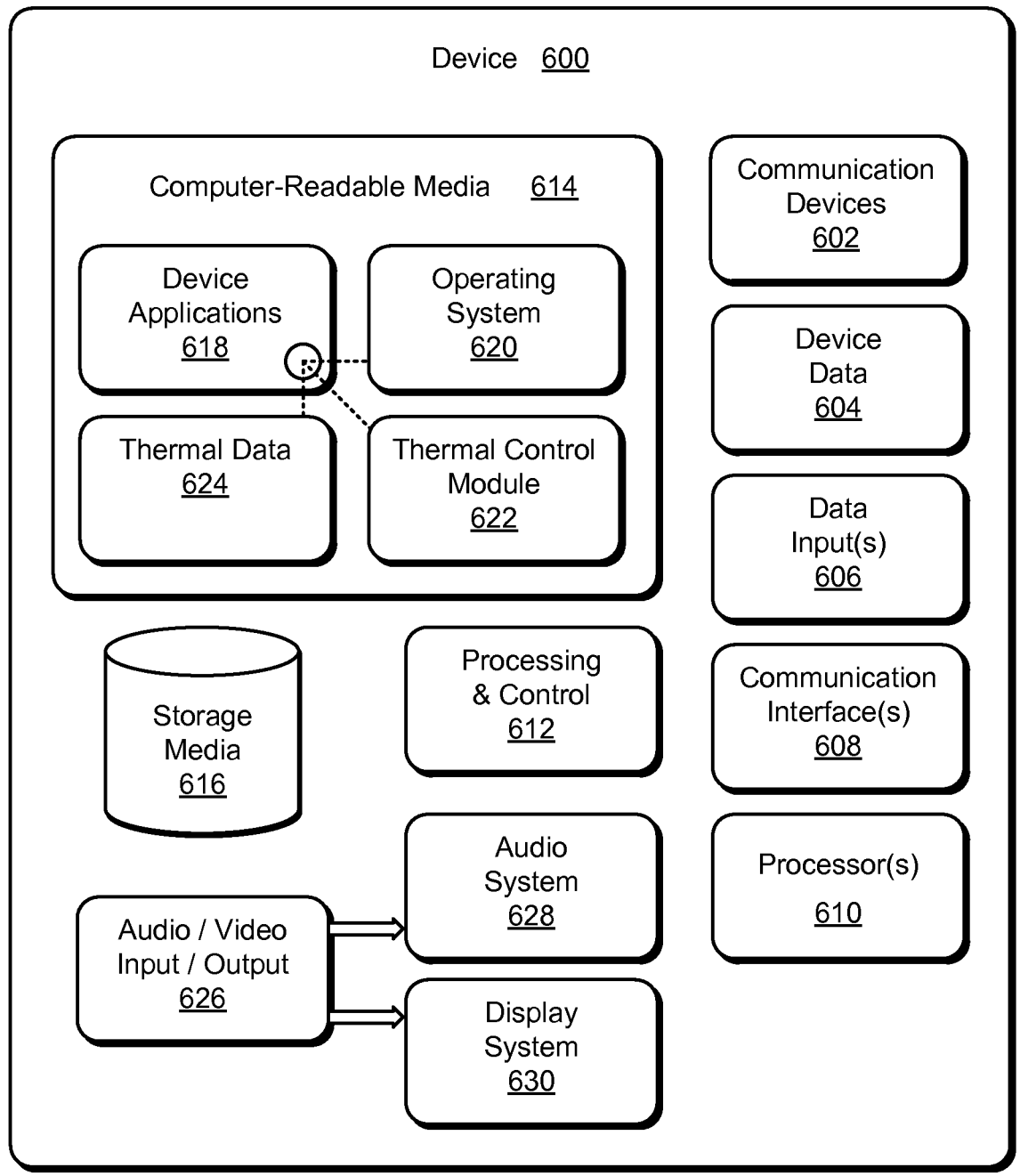
FIG. 6 illustrates various components of an example device that can be implemented as any type of computing device as described with reference to FIGS. 1, 2, and 6 to implement embodiments of the techniques described herein.

FIG. 6 illustrates various components of an example device 600 that can be implemented as any type of computing device as described with reference to FIGS. 1, 2, and 6 to implement embodiments of the techniques described herein. Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608 that can be implemented as any one or more of a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like) which process various computer-executable instructions to control the operation of device 600 and to implement embodiments of the techniques described herein. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable media 614 provides data storage mechanisms to store the device data 604, as well as various device applications 618 and any other types of information and/or data related to operational aspects of device 600. For example, an operating system 620 can be maintained as a computer application with the computer-readable media 614 and executed on processors 610. The device applications 618 can include a device manager (e.g., a control application, software application, signal processing and control module, code that is native to a particular device, a hardware abstraction layer for a particular device, etc.). The device applications 618 also include any system components or modules to implement embodiments of the gesture techniques described herein.

In this example, the device applications 618 include a thermal control module 622 (which may be the same or different as thermal controller 122) and thermal data 624 that are shown as software modules and/or computer applications. Thermal control module 622 is representative of software that is used to manage fans by implementing features of indirect thermal fan control. Alternatively or in addition, thermal data 624 represents data collected during iterations of indirect thermal fan control that can be used to construct an information table of fan speeds correlating to particular air temperatures and current draw amount. In some cases, thermal control module 622 can reference this information table when adjusting a speed of a fan. Thermal control module 622 can be implemented as hardware, software, firmware, or any combination thereof.

Device 600 also includes an audio and/or video input-output system 626 that provides audio data to an audio system 628 and/or provides video data to a display system 630. The audio system 628 and/or the display system 630 can include any devices that process, display, and/or otherwise render audio, video, and image data. Video signals and audio signals can be communicated from device 600 to an audio device and/or to a display device via an RF (radio frequency) link, S-video link, composite video link, component video link, DVI (digital video interface), analog audio connection, or other similar communication link. In an embodiment, the audio system 628 and/or the display system 630 are implemented as external components to device 600. Alternatively, the audio system 628 and/or the display system 630 are implemented as integrated components of example device 600.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. An apparatus comprising:
    a current sensor configured to monitor current consumption of an electrical component within an enclosure;
    a temperature sensor configured to monitor a temperature of air entering the enclosure;
    a fan configured to affect airflow proximate the electrical component;
    one or more modules communicatively coupled to the current sensor, the temperature sensor, and the fan, the one or more modules configured to:
        receive an indication of the current consumption from the current sensor;
        receive an indication of the temperature of the air from the temperature sensor;
        calculate a power consumption of the electrical component based on the indication of the current consumption and a voltage level of a voltage rail operably coupled with the electrical component;
        estimate a temperature of the electrical component based on the indication of the temperature of the air and the calculated power consumption of the electrical component;
        cause, based on the indications of the current consumption, the calculated power consumption, the estimated temperature of the electrical component, and the temperature of the air, a change to a speed of the fan effective to manage a temperature of the electrical component.

2. An apparatus described in claim 1, wherein the cause of the change in fan speed is further based on a table containing information correlating a temperature of electrical component with the current consumption and the temperature of the air.

3. An apparatus described in claim 1, wherein the change in fan speed is effective to mitigate excessive noise associated with the fan.

4. An apparatus described in claim 1, wherein the indication of the current consumption is received from a power supply providing power to a power rail to which the electrical component is operably coupled.

5. An apparatus described in claim 1, wherein the indication received from the temperature sensor and the current sensor is received via a System Management Bus (SMBus), 1-wire, or Inter-Integrated Circuit (I²C) communication protocol.

6. An apparatus as described in claim 1, wherein the apparatus comprises a laptop computer.

7. An apparatus as described in claim 1, wherein the apparatus comprises a television device.

8. An apparatus as described in claim 1, wherein the apparatus comprises a desktop computer.

9. An apparatus as described in claim 1, wherein the apparatus comprises a gaming device.

10. An apparatus as described in claim 1, wherein the apparatus comprises a server.

11. A method comprising:
    monitoring, using a current sensor, current consumption of an electrical component within an enclosure;
    monitoring, using a temperature sensor, temperature of air entering the enclosure;
    employing a fan to affect airflow proximate the electrical component;

using one or more modules, communicatively coupled to the current sensor, the temperature sensor, and the fan, to perform operations comprising:

receiving an indication of the current consumption from the current sensor;

receiving an indication of the temperature of the air from the temperature sensor;

calculating a power consumption of the electrical component based on the indication of the current consumption and a voltage level of a voltage rail operably coupled with the electrical component;

estimating a temperature of the electrical component based on the indication of the temperature of the air and the calculated power consumption of the electrical component;

causing, based on the indications of the current consumption, the calculated power consumption, the estimated temperature of the electrical component, and the temperature of the air, a change to a speed of the fan effective to manage a temperature of the electrical component.

12. The method of claim 11, wherein said causing is further based on a table containing information correlating a temperature of electrical component with the current consumption and the temperature of the air.

13. The method of claim 11, wherein the change in fan speed is effective to mitigate excessive noise associated with the fan.

14. The method of claim 11, wherein receiving the indication of the current consumption comprises receiving the indication from a power supply providing power to a power rail to which the electrical component is operably coupled.

15. The method of claim 11, wherein receiving the indication from the temperature sensor and the current sensor comprises receiving the indications via a System Management Bus (SMBus), 1-wire, or Inter-Integrated Circuit (I²C) communication protocol.

16. A computing device comprising:

a display enclosure housing a plurality of display components;

a current sensor configured to monitor current consumption of one or more display components within the display enclosure;

a temperature sensor configured to monitor a temperature of air entering the display enclosure;

a fan configured to affect airflow proximate the display components;

one or more modules communicatively coupled to the current sensor, the temperature sensor, and the fan, the one or more modules configured to:

receive an indication of the current consumption from the current sensor;

receive an indication of the temperature of the air from the temperature sensor;

calculate a power consumption of the one or more display components based on the indication of the current consumption and a voltage level of a voltage rail operably coupled with the one or more display components;

estimate a temperature of the one or more display components based on the indication of the temperature of the air and the calculated power consumption of the electrical component;

cause, based on the indications of the current consumption, the calculated power consumption, the estimated temperature of the one or more display components, and the temperature of the air, a change to a speed of the fan effective to manage a temperature of the one or more display components.

17. The computing device of claim 16, wherein the cause of the change in fan speed is further based on a table containing information correlating a temperature of electrical component with the current consumption and the temperature of the air.

18. The computing device of claim 16, wherein the change in fan speed is effective to mitigate excessive noise associated with the fan.

19. The computing device of claim 16, wherein the indication of the current consumption is received from a power supply providing power to a power rail to which the electrical component is operably coupled.

20. The computing device of claim 16, wherein the indication received from the temperature sensor and the current sensor is received via a System Management Bus (SMBus), 1-wire, or Inter-Integrated Circuit (I²C) communication protocol.

* * * * *